US005751868A

United States Patent [19]
Bala et al.

[11] Patent Number: 5,751,868
[45] Date of Patent: May 12, 1998

[54] ASYMETRICALLY DILATED OPTICAL CROSS CONNECT SWITCHES

[75] Inventors: Krishna Bala, Eatontown; Charles Arthur Brackett, Mendham, both of N.J.; Ghie Hugh Song, Kwangju, Rep. of Korea

[73] Assignee: Bell Communications Research, Inc., Morristown, N.J.

[21] Appl. No.: 871,056

[22] Filed: Jun. 9, 1997

Related U.S. Application Data

[63] Continuation of Ser. No. 498,080, Jul. 3, 1995, abandoned.

[51] Int. Cl.$^6$ .............................. G02B 6/26; H01J 14/00
[52] U.S. Cl. ........................... 385/16; 385/17; 385/20; 385/24; 359/117; 359/128
[58] Field of Search ............................ 385/7, 11, 16, 385/17, 20, 21, 24; 359/117, 118, 127, 128

[56] References Cited

U.S. PATENT DOCUMENTS

| | | | |
|---|---|---|---|
| 4,822,124 | 4/1989 | Suzuki | 385/17 |
| 4,837,855 | 6/1989 | Hajikano et al. | 455/600 |
| 4,932,735 | 6/1990 | Koai | 385/17 |
| 5,002,349 | 3/1991 | Cheung et al. | 385/1 |
| 5,002,534 | 3/1991 | Koai | 385/21 |
| 5,018,129 | 5/1991 | Netravali et al. | 385/16 X |
| 5,133,029 | 7/1992 | Baran et al. | 385/11 |
| 5,173,794 | 12/1992 | Cheung et al. | 359/127 |
| 5,218,653 | 6/1993 | Johnson et al. | 385/11 |
| 5,241,610 | 8/1993 | Labiche et al. | 385/16 |
| 5,390,178 | 2/1995 | Hunter | 359/117 X |
| 5,446,809 | 8/1995 | Fritz et al. | 385/17 |
| 5,477,362 | 12/1995 | Okamoto et al. | 359/123 |

OTHER PUBLICATIONS

Brackett et al., "A Scalable Multiwavelength Multihop Optical Network: A Proposal for Research on All–Optical Networks," *Journal of Lightwave Technology*, vol. 11, 1993, pp. 736–753.

Hinton, *An Introduction to Photonic Switching Fabrics*, (Plenum, 1993), Chap. 2, pp. 39–81, 89–93, 104, and 105.

Alferness et al., Low loss, wavelength tunable, waveguide electro-optic polarization controller for $\lambda=1.32\mu m$, *Applied Physcis Letters*, vol. 45, 1985, pp. 1137–1139.

St. Ville et al., "System design and technologies for WDM networks," *Integrated Photonics Research*, 1994 Technical digest Series, vol. 3 (Optical Society of America, Washington, DC, 1994), pp. 232–234.

Cheung et al., "Simultaneous five–wavelength filtering at 2.2–nm separation using integrated–optic acousto–optic tunable filter with subcarrier detection," *Electronics Letters*, vol. 25, 1989, pp. 636–637.

Choy et al., "Observation of coherent inter–channel interference in the multiwavelength operation of an acoustooptic filter," *IEEE Photonics Technology Letter*, vol. 1, 1989, pp. 171–172.

(List continued on next page.)

*Primary Examiner*—Rodney B. Bovernick
*Assistant Examiner*—Hemang Sanghavi
*Attorney, Agent, or Firm*—Joseph Giordano; Loria B. Yeadon; David Hey

[57] ABSTRACT

A horizontally asymmetrically dilated optical switch comprising multiple stages of 2×2 optical switching units, especially electro-optic switching units such as acousto-optical tunable filters (AOTFs), which are electrically switchable between a bar state and a cross state to route and switch an optical signal through the switch. The switch is dilated that is, the switching units have an unused input or output so as to dump crosstalk terms into unused outputs. According to the invention, the interconnections between the switching units and their control are such that any optical signal and any crosstalk path passes through equal numbers of bar-state switches and of cross-state switches. Thereby, two advantages are gained. First, no switching path is transparent to a wide bandwidth so that noise cannot recirculate in an amplifying path and go into oscillation. Also, if one state or the other produces greater crosstalk, along no switching path is the larger term accumulated more than the smaller term.

13 Claims, 11 Drawing Sheets

OTHER PUBLICATIONS

Baran et al., "Multiwavelength performance of an apodized acousto–optical switch," *Conference on Optical Fiber Communications*, vol. 4 of 1994 Technical Digest Series (Optical Society of America, Washington, DC, 1994), paper, pp. 57, 58.

Song et al., "Time–dependent model of an acousto–optic tunable filter for multiple–channel interaction," *Optical Society of America Integrated Photonics Research Meeting '95*, Nov. 1994.

Jackel et al., "Multi–channel operation of AOTF switches: reducing channel to–channel interaction," IEEE Photonics Technology Letters, vol. 7, 1995, pp. 370–372.

Bala et al., "Cycles in Wavelength Routed Optical Networks," *LEOS 1994: Summer Topical Meeting Digest on Integrated Optoelectronics*, Lake Tahoe, NV, Jul. 6–13, 1994, pp. 7, 8.

Kawachi et al., "Silica–based optical–matrix switch with intersecting Mach–Zehnder waveguides for larger fabrication tolerances," *OFC/IOOC '93 Technical Digest*, paper TuH4, pp.33, 34.

Smith et al., "Reduction of cross talk in an acousto–optic switch by means of dilation," *Optics Letters*, vol. 19, 1994, pp. 99–101.

Watson et al., "A Low–voltage 8 —8 Ti:LiNbO$_3$ switch with a dilated–Benes architecture," *Journal of Lightwave Technology*, vol. 8, 1990, pp. 794–801.

Padmanabhan, "Dilated Networks for Photonic Switching, " *IEE Transactions on Communications*, vol. COM–35, 1987, pp. 1357–1365.

ASYMETRICALLY DILATED OPTICAL CROSS CONNECT SWITCHES

This application is a continuation of application Ser. No. 08/498,080 filed Jul. 3, 1995 now abamdoned.

GOVERNMENT RIGHTS

The invention was made with government support under Agreement No. MDA972-92-H-0010 awarded by DARPA. The government has certain rights in the invention.

FIELD OF THE INVENTION

The invention relates generally to optical switching circuits. In particular, the invention relates to data communication switches utilizing cascaded stages of optical switches, especially electro-optic switches, one example of which is an acousto-optical polarization converter, also referred to as acousto-optical tunable filter.

BACKGROUND OF THE INVENTION

Switches in conventional telephone and other data networks selectively connect lines that interlink multiple switches or link the switches to the ultimate telecommunication user. Such conventional switches rely on an electrical connection between the incoming and outgoing lines so that an electrical signal is transmitted from one to the other. In modern time-division multiplexing (TDM) networks, switching is performed quickly enough to allow a physical channel to convey sequences of relatively small packets of data which can be switched in different directions and to allow the packets be reassembled at the respective receivers. Although such switches have afforded the national and international data networks now available, their utility is limited as data rates continue to greatly increase with video on demand and other bandwidth-intensive applications.

Optical fibers have provided a transmission medium allowing transmission bandwidths in the range of hundreds of gigahertz ($\approx 10^{14}$ Hz) between such switches, but conventional electronic switches have required that the optical signals on the incoming fiber be converted to electrical signals, the electrical signals be electronically switched, and the switched signals be reconverted to optical signals. Not only is such a switching procedure cumbersome, but electronic switches are generally limited to data rates of a few gigabits per second ($\approx 10^9$ b/s).

The electronic bottle-neck at switches can be avoided by an all-optical communication network in which optical signals are switched without being converted to electronic form. One such all-optical network utilizing wavelength-division multiplexing (WDM) is discussed by Brackett et al. in "A Scalable Multiwavelength Multihop Optical Network: A Proposal for Research on All-Optical Networks," *Journal of Lightwave Technology*, vol.11, 1993, pp. 736–753. An exemplary schematic of such a WDM network is shown in FIG. 1 in which four access nodes 10,12, 14 and 16 are interconnected through a WDM telecommunications network 18 including, in the simple example, two ring networks 20 and 22 interconnected by a WDM network cross-connect 24 and four add-drop cross-connects 26, 28, 30, and 32. In large part, the network cross-connect 24 does not greatly differ functionally from the add-drop cross-connects 26, 28, 30, and 32. To maintain signal levels, amplifiers, such as erbium-doped fiber amplifiers (EDFAs) 36 are inserted in the rings 20 and 22. In one possible use of the configuration shown in FIG. 1, which may be quickly changing, each access node 10 through 16 is receiving on an incoming line 34 an optical signal at a carrier wavelength $\lambda_i$ identified to itself and transmitting on an outgoing line 36 an optical signal on a carrier wavelength $\lambda_j$ that is identified to the receiving access node for which the signal is intended. The WDM network cross-connect 24 switches the signals according to their optical carrier wavelength $\lambda_i$ without the need of converting the optical signals to electronic form. Other architectures are possible using similar concepts and components.

In a realistic network, the WDM network switches 24 through 32 must be reconfigurable so as to be able to switch signals from any access node to any other access node and to do so while maintaining the signals in their optical states. Such cross connects present a technological challenge and may well limit the performance of the WDM network.

Many types of optical switches have been proposed and tested. See, for example, Hinton, *An Introduction to Photonic Switching Fabrics*, (Plenum, 1993), Chap. 2, pp. 39–81. As an example of the invention that will be more thoroughly discussed below, Brackett et al. follow the proposal of Cheung et al. in U.S. Pat. No. 5,173,794 and suggest the use of acousto-optic tunable filters (AOTFs) to effect such switching. However, it must be emphasized that an AOTF is but one example of many types of optical switches to which the invention may be applied although the AOTF enjoys the advantage of multi-frequency switching. An AOTF can selectively change the polarization state of one or more of multiple wavelength-division optical signals on a solid state waveguide, hence it is fundamentally a polarization converter. The AOTF additionally contains couplers that divide the signals from the waveguide according to their polarization states. Thereby, signals can be selectively removed from the waveguide and switched to another waveguide. The most common type of AOTF is an opto-electronic circuit integrated into a substrate of $LiNbO_3$, although other types are possible. Cheung et al. disclose the fundamentals of such AOTFs in U.S. Pat. No. 5,002,349, incorporated herein by reference. Baran et al. and Johnson et al. disclose improvements for AOTFs based on integrated polarization beam splitters in U.S. Pat. Nos. 5,133,029 and 5,218,653 respectively.

The structure of a simpler AOTF 40, illustrated in schematic plan view in FIG. 2, is used as the exemplary switch unit in much of the present work. Two optical waveguides 42 and 44 are formed in a lithium niobate substrate 46. An interdigitated acoustic transducer 48 is formed over input ends of the waveguides 42 and 44 and is driven by a multi-frequency RF generator 50. Two Glan-Thompson polarization beam splitters 52 and 54 are disposed respectively at the input and output sides to receive and transmit optical signals respectively. One waveguide 42 is optically coupled to the polarization beam splitters 52 and 54 by polarization-maintaining optical fibers 56 while the other waveguide 44 is coupled by 90°-twisted polarization maintaining optical fibers 58 which rotate the polarization by 90° relative to the other fibers 56. Other structures provide equivalent acousto-optical switching for the purposes of this invention.

If a dual-polarized optical signal is received on the upper, left input, the input polarization beam splitter 52 divides it according to polarization, but the 90°-twisted fiber 58 rotates one of the components so both component enter the polarization converter 46 with the same polarization. If the RF generator 50 is tuned to an RF frequency corresponding to the optical carrier, the polarization converter 46 changes the polarization of both components, and, by a procedure complementary to that on the input end, the two components are recombined on one of the two optical outputs with orthogonal polarizations. On the other hand, if the RF generator 50 is not tuned to the optical carrier, both components are recombined on the other optical output.

Assuming a four-frequency, dual-input system, the upper, left input is impressed with four optical signals having optical wavelengths $\lambda_1$, $\lambda_2$, $\lambda_3$, and $\lambda_4$ and each is modulated with a different data signal. The lower, left input is impressed with another four optical signals having the same or nearly the same optical wavelengths and each of which is modulated with yet another different data signal. For convenience, this second set of optical signals are represented by $\lambda'_1, \lambda'_2, \lambda'_3$, and $\lambda'_4$. The equality of number of channels and the identity of frequencies on the two inputs are not required. In particular, the two inputs may be divided into the same wavelength channels, but the signals on the two inputs may differ somewhat in wavelength within the wavelength channels.

When the RF generator 50 modulates the acoustic transducer 48 at an electrical frequency corresponding to one of the optical wavelengths $\lambda'_1$, $\lambda'_2$, $\lambda'_3$, or $\lambda'_4$ as related by material and fabrication parameters, particularly the birefringence of the waveguide at that wavelength, the acoustical and optical signals resonate and the polarization state of that optical signal is converted. Thereby, those polarization-converted components are switched to the other channel. For example, if the RF generator 50 drives the transducer 48 at electrical frequencies $f_2$ and $f_3$ corresponding the optical wavelengths $\lambda_2$ and $\lambda_3$, all the optical signals $\lambda_2$, $\lambda_3$, $\lambda'_2$, and $\lambda'_3$ are switched to the respective other channels while the optical signals $\lambda_1, \lambda_4, \lambda'_1$, and $\lambda'_4$ remain unswitched on their respective original channels.

Similar descriptions are available for other types of optical switches, some of which are multi-frequency switches and others of which switch only a single frequency optical carrier.

On a more fundamental level, a single AOTF or other optical switch 40 schematically represented in FIG. 3 can, in the represented bar state in which the acoustic and optical waves do not resonate, transmit incident signals $\lambda_i$ and $\lambda'_i$ along their initial principal waveguides 60 and 61. Generally, the bar-state transmission spectrum is quite wide so that the bar-state is characterized as transparent to all signals except a fairly narrow switched waveband. That is all unswitched signals, whether unswitched channels, inter-channel noise, extra-channel noise, or otherwise is transmitted to the bar-port.

A crossing network 62 is physically present but, by action of the electrical control, e.g., the RF generator 50 or other selecting means, is not effective according to the switch design. In the AOTF embodiment of FIG. 2, the crossing network includes the polarization beam splitters 52 and 54 and the selective polarization converter 46. However, the AOTF 40 can, as schematically illustrated in FIG. 4 in the cross state in which the acoustic and optical waves do resonate, interchange the signals $\lambda_i$ and $\lambda'_i$ across the operating crossing network 62.

Resonance between the acoustic and optical waves means that the RF generator causes the polarization state of the optical wave to be rotated.

The concept of bar and cross states has been developed here for AOTFs, but it is applicable to other types of optical switches, whether electro-optic, liquid crystal, or even mechanical. The distinction between the bar and cross states is not completely rigid within the literature. However, we will follow the effects observed within AOTFs, specifically, a bar state means that optical signals continue along a principal path without any interaction with the selecting means that would switch them to another path, in particular an interaction specific to a particular optical wavelength. On the other hand, in a cross state, an externally imposed selection signal interacts with the optical signal and causes it to switch to another path, in particular, one particular waveband is caused to switch in an AOTF. This distinction means that the bar-state path is transparent to all optical signals except the switched waveband while the cross-state path is generally opaque except for the switched waveband. This distinction becomes important when out-of-band noise is considered.

Although the following discussion will primarily involve AOTFs for which the bar and cross states have been defined above, the invention is applicable to almost any optical switching element, whether 2×2, 1×2, 2×1, or some larger size. Almost always, one switching path of the switching element functionally differs from the other switching path; that is, the switching element has two switching states. Each switching state has its own set of physical characteristics, some of which are more (or less) advantageous than those of the complementary state.

It must be understood that the cross and bar states of FIGS. 3 and 4 refer to one wavelength channel at a time for the AOTF. The same switch 40 may be in the bar state for some wavelengths and in the cross state for others. Also, the effects of such a switch, particularly regarding crosstalk, are largely similar whether the switch is an acousto-optical converter or another type of optical switch. Alferness et al. disclose one of the earliest electro-optic switches in "Low loss, wavelength tunable, waveguide electro-optic polarization controller for $\lambda=1.32$ μm," *Applied Physics Letters*, vol. 45, 1985, pp. 1137–1139. St. Ville et al. presents a systems-oriented discussion of optical switching units in "System design and technologies for WDM networks," *Integrated Photonics Research*, 1994 Technical Digest Series, vol. 3 (Optical Society of America, Washington, DC, 1994), pp. 232–234.

The AOTF's ability to selectively switch (and interexchange) any of multiple optical wavelength signals is a powerful tool in WDM networks. However, AOTFs and similarly performing optical switches have problems which may limit their usefulness in all-optical networks. The two main problems discussed here are crosstalk and oscillations caused by transparent cycles.

Crosstalk has long been recognized as being a significant problem in AOTFs and other electro-optic switches. See, for example: (1) Cheung et al., "Simultaneous five-wavelength filtering at 2.2-nm separation using integrated-optic acousto-optic tunable filter with subcarrier detection," *Electronics Letters*, vol. 25, 1989, pp. 636, 637; (2) Choy et al., "Observation of coherent inter-channel interference in the multiwavelength operation of an acoustooptic filter," *IEEE Photonics Technology Letter*, vol. 1, 1989, pp.171,172; (3) Baran et al., Multiwavelength performance of an apodized acousto-optical switch," *Conference on Optical Fiber Communications*, vol. 4 of 1994 Technical Digest Series (Optical Society of America, Washington, DC, 1994), paper, pp. 57, 58; (4) Song et al., "Time-dependent model of an acousto-optic tunable filter for multiple-channel interaction," Optical Society of America Integrated Photonics Research Meeting '95, Nov. 1994; and (5) Jackel et al., "Multi-channel operation of AOTF switches: reducing channel-to-channel interaction," IEEE Photonics Technology Letters, vol. 7, 1995, pp. 370–372.

AOTFs and other similar optical switches experience two principal types of crosstalk, namely, sidelobe response and nonideal rejection response.

A cross-state passband spectrum 64 at the cross port, illustrated in FIG. 5, for a wavelength $\lambda_2$ has a large peak 65 but intrinsically large side-lobes 66. Even by placing an adjacent channel in the inter-peak trough 67, significant crosstalk of the order $\epsilon$ remains. Sidelobe crosstalk is the crosstalk response of light measured at the cross port when the neighboring channel(s) is/are switched but the channel of concern is not switched.

Rejection crosstalk is illustrated in FIG. 6. A cross-state spectrum 68 at the bar port has a minimum 70 which differs from zero by an amount $\delta$. That is, the crosstalk $\delta$ quantifies the response of light measured at the bar port when the concerned light channel is being switched to the cross port.

FIGS. 7 and 8 show respective spectra 72 and 74 within a specific model for the cross-state passbands at the cross port and the bar port when multiple channels $\lambda_1$ and $\lambda_2$ are co-switched. When multiple channels are co-switched, the bar-port crosstalk levels significantly degrade compared to when a single channel is being switched. On the other hand, within this model, the cross-port crosstalk levels do not significantly worsen although this is not generally true.

A problem perhaps more critical than crosstalk involves the fact that the rings 20 and 22 of FIG. 1 are in the simplest designs transparent to all optical signals except to specific signals that are switched out of the rings. Because of the amplification provided by the fiber amplifiers 36, a recirculating signal can be continuously amplified to the point that it oscillates, similarly to a ring laser, and drives the amplifiers 36 into saturation and causes other undesirable effects in the cross-connects 24 through 32. Although a well controlled ring does not allow an intended signal to uncontrollably circulate, the network control extends only to the finite number of intended signals, e.g. $\lambda_1$, $\lambda_2$, $\lambda_3$, and $\lambda_4$ described above. However, amplified spontaneous emission (ASE) is noise generated in the EDFAs 36 or other network components that is amplified on passing through successive amplifiers 36. Such out-of-band noise signals are not specifically controlled, and, if a ring is transparent to them, they can degrade the response of network elements and overwhelm the intended signals. Two of us have described how to break cycles in "Cycles in Wavelength Routed Optical Networks," LEOS 1994: *Summer Topical Meeting Digest on Integrated Optoelectronics*, Lake Tahoe, Nev., Jul. 6–13, 1994, pp. 7, 8 by Bala et al. The cycle-breaking problem is not restricted to AOTFs.

Kawachi et al. describe a solution for a similar solution in thermo-optic switches in "Silica-based optical-matrix switch with intersecting Mach-Zehnder waveguides for larger fabrication tolerances," OFC/IOOC '93 Technical Digest, paper TuH4, pp. 33, 34. However, their solution introduces a large variability of pathlength and number of switching elements encountered and is not appropriate for the types of system architectures being considered here.

Several groups have suggested a solution to the crosstalk problem by dilating switching networks in which the size of the switch is increased so as to be able to discard those routes which have excessively high cross talk. The solutions in AOTFs seem to be most developed and will be discussed in depth, but the discussion for the most part is applicable to most optical switches.

One such dilated AOTF switching network is disclosed by d'Alessandro et al. in U.S. application Ser. No. 08/030,690, filed Mar. 12, 1993, now abandoned. Part of this same work is discussed by Smith et al. In "Reduction of cross talk in an acousto-optic switch by means of dilation," Optics Letters, vol. 19, 1994, pp. 99–101. A general dilated 2×2 AOTF switch 80 of their invention schematically shown in FIG. 9 includes four AOTF switching units 82, 84, 86, and 88. Two switching units 82 and 84 are arranged at the input side to receive respective input signals SU and S'U' on primary input waveguides 90 and 92. Here "S" stands for a switched-channel signal, and "U" stands for an unswitched-channel signal. Secondary input waveguides 94 and 96, although present within the switching fabric of the switching units 82 and 84, in this embodiment do not receive useful signals. The first input switching unit 82 receives the input signals SU and, dependent upon the RF signals applied to the acoustic transducer within the AOTF switching unit 82, leaves the unswitched-channel signal or signals U on the bar-port waveguide 90 or transfers the switched-channel signal or signals S to the other waveguide 94. Similarly, the second input switching unit 84 similarly leaves the unswitched-channel signals U' on the bar-port waveguide 96 but transfers the switched-channel selected signals S' to the other waveguide 92. In this configuration, in the first stage of switches 82 and 84, the switched-channel signals experience the cross state and the unswitched-channel signals experience the bar state of the AOTF switching units 82 and 84.

The outputs 98, 100, 102, and 104 of the first-stage switching units 82 and 84 are shuffled to inputs of the second-stage switching units 86 and 88, which act similarly to the first-stage switching units 82 and 84, so that the unswitched-channel signals U and U' are left on the same respective principal output waveguide 104 or 106 and the switched-channel signals S and S' are shuffled to the other respective principal output waveguide 106 or 104. That invention takes advantage of the fact that the various first-order residual and cross-talk signals u, s, u', and s' end up on secondary output waveguides 108 and 110 which are discarded or dumped. The effect of that invention, at least as illustrated in FIG. 6, is obtained only by a particular control configuration for the four switches 82, 84, 86, and 88, as summarized in TABLE 1.

TABLE 1

| SWITCH STATE | FIRST STAGE | SECOND STAGE |
| --- | --- | --- |
| SWITCHED | CROSS | CROSS |
| UNSWITCHED | BAR | BAR |

A signal presented at either of the two primary input waveguides 90 or 92 sees either a switched-channel array state, illustrated in FIG. 10, or an unswitched-channel array state, illustrated in FIG. 11. This configuration may be characterized as being vertically symmetric as well as horizontally symmetric. This architecture results in the crosstalk being, referring back to the discussion of FIGS. 5 through 8, of order $\epsilon^2$ or $\delta^2$. However, we observe that this solution is advantageous only if $\delta$ and $\epsilon$ are of approximately the same size. Otherwise, one of the terms $\epsilon^2$ or $\delta^2$ may be unacceptably large in a particular switch configuration. Smith did not consider the relative sizes of the error terms. In some of our simulations, the term $\delta^2$ was particularly large.

In regards to the cycle problem, the architecture of TABLE 1 is particularly disadvantageous. All unswitched signals pass the two switching units in the transparent bar states. As a result, noise is amplified and can saturate the network.

Padmanabhan et al. disclose a dilated architecture for integrated optical switches, of which AOTFs are one type, in IEEE Transactions on Communications, vol. COM-35, 1987, pp. 1357–1365. They were primarily interested in other aspects of dilated switches, but in FIG. 4(c) of their paper they presented a switch architecture shown in FIG. 12 in which four switching units 112, 114, 116, and 118 are arranged in a 2×2 configuration to switch two signals $I_1$ and $I_2$ on two respective input waveguides 120 and 122 to two output signals $O_1$ and $O_2$ on the two output waveguides 124 and 126. Their description is unclear as to what precise switch architecture and internal connection paths were intended.

SUMMARY OF THE INVENTION

The invention can be summarized as a horizontally asymmetric optical switch comprising multiple stages of switching units having two switching states. The switching units are arranged and controlled such that any crosstalk or signal path through the switch entails passing through an equal number of switching units in each of the two switching states. For the case of many switches, especially of an acousto-optic tunable filter (AOTF), the two states are the cross and bar states, that is, the states in which the RF signal or other control signal causes or does not cause the optical signal to switch to a different waveguide. Thereby, out-of-band oscillations are suppressed, and overall crosstalk levels are reduced.

DETAILED DESCRIPTION OF THE PREFERRED EMBODIMENTS

A choice of the various dilated architectures requires a better understanding of both the paths creating closed cycles and the relative sizes of various noise sources.

Closed cycles are found in networks in which the network has a state in which a path is transparent to a large band of optical signals. Although the network should not absorb selected signal bands, a wide-band transparency allows spontaneous noise to be amplified, to recirculate, and to eventually oscillate to the detriment of the intended signals. According to the invention, each switching node is horizontally asymmetrically dilated such that each channel path crosses through two switches in alternative states, typically identified as the bar and cross states. The cross-state switch path is opaque except at well specified wavelengths, usually corresponding to the optical signals of interest. Therefore, the network is not transparent to noise, and oscillations are prevented.

Figure 1:
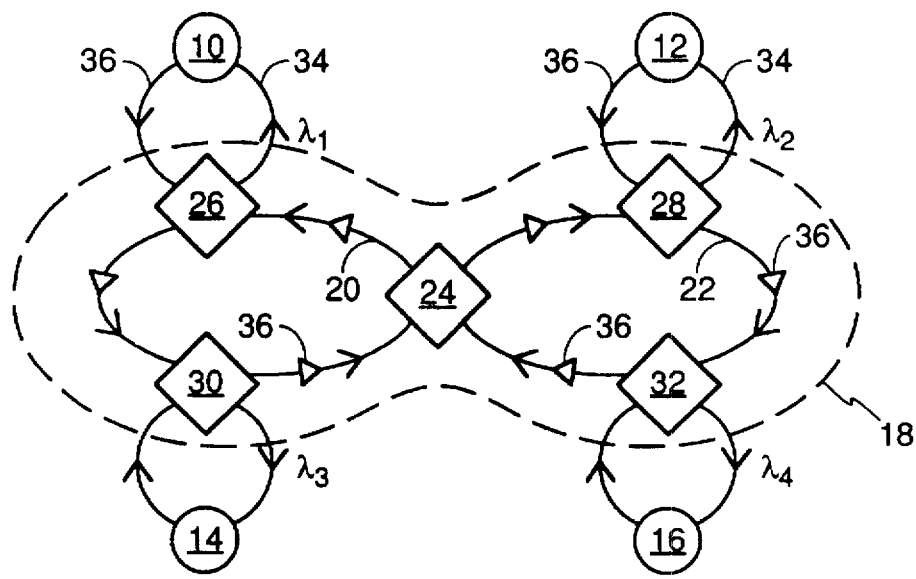
FIG. 1 is schematic illustration of a wavelength-division multiplexed (WDM) network for which the present invention may be used.
Figure 2:
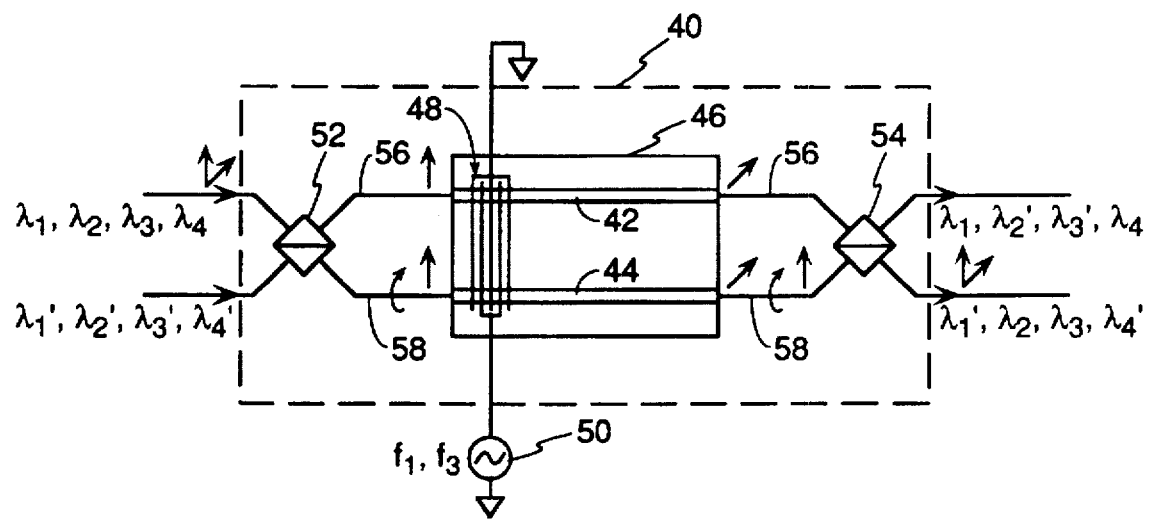
FIG. 2 is a plan and schematic view of an acousto-optic tunable filter (AOTF) usable with the present invention.
Figure 3:
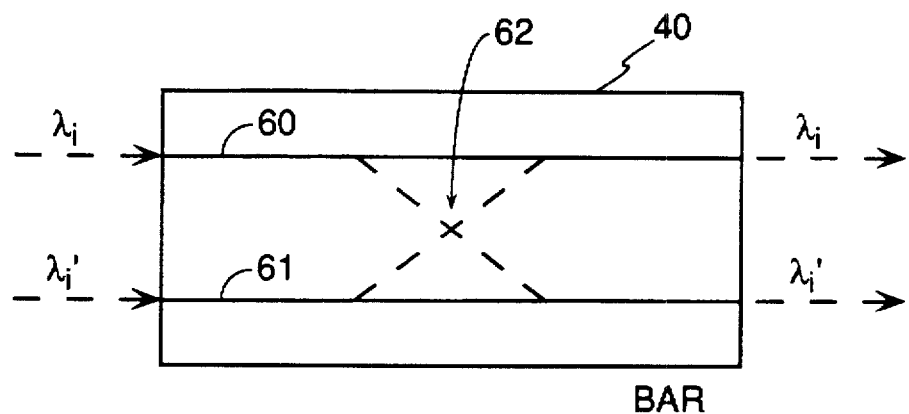
FIGS. 3 and 4 are schematic illustrations of the bar and cross states of an AOTF.
Figure 4:
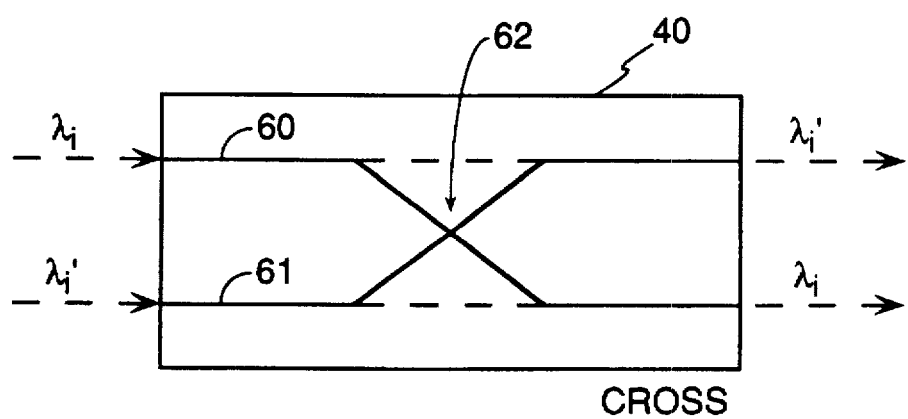
Figure 5:
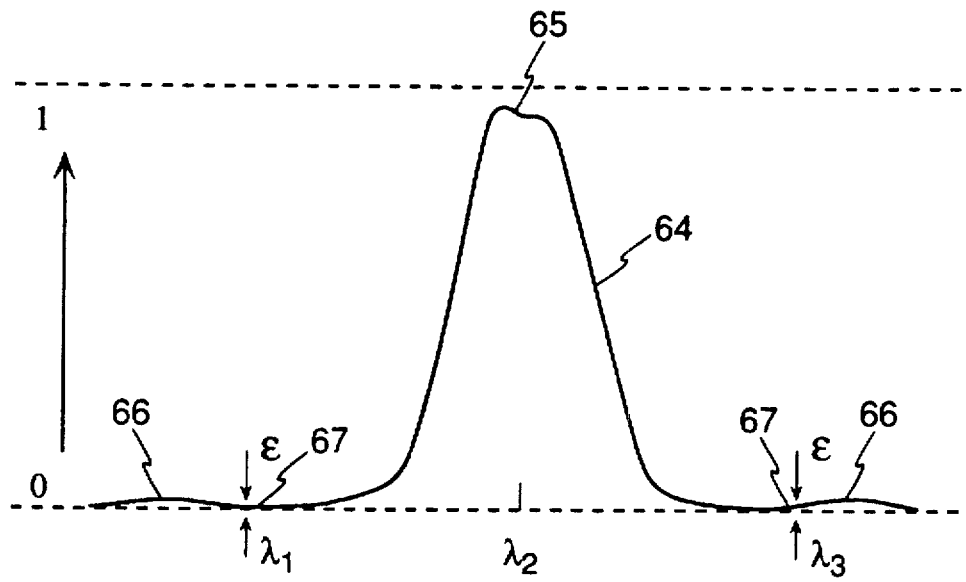
FIGS. 5 and 6 are schematic representations of transmission spectra of a typical AOTF or other optical switches.
Figure 6:
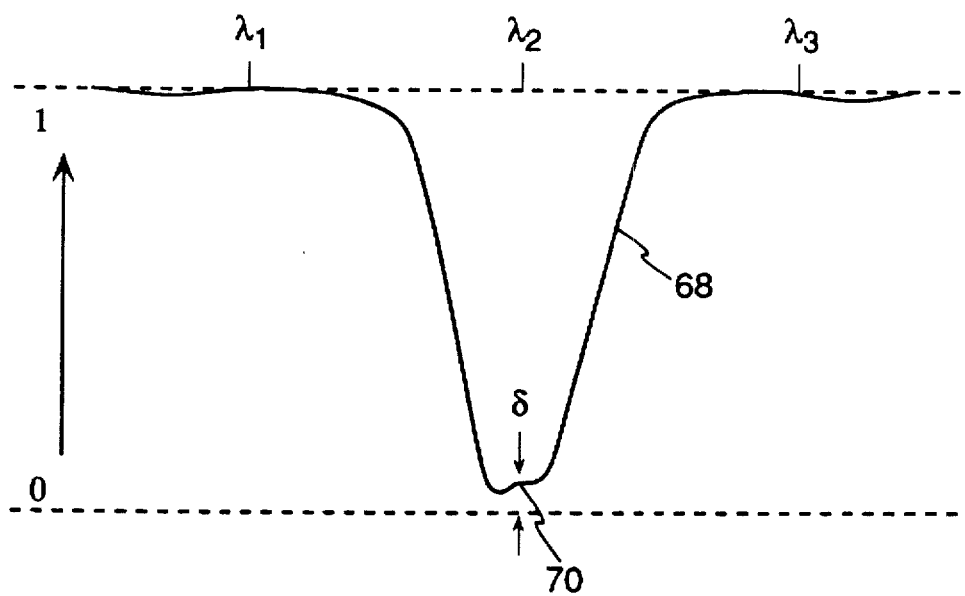
Figure 7:
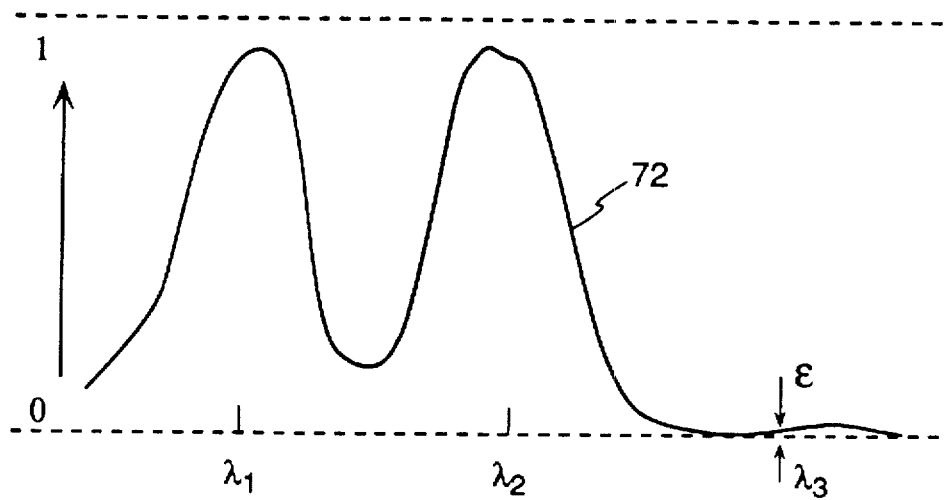
FIGS. 7 and 8 are schematic represenions corresponding to FIGS. 5 and 6 for multiple switched channels.
Figure 8:
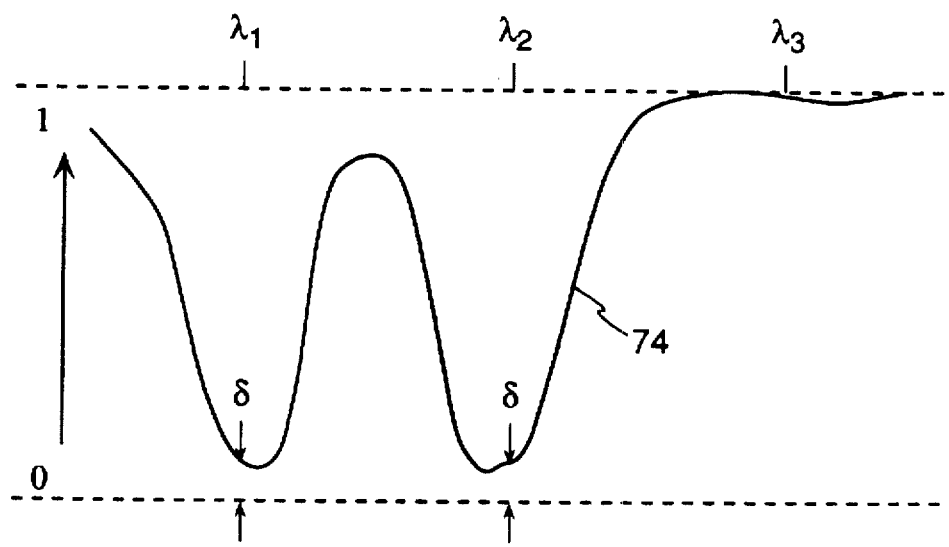
Figure 9:
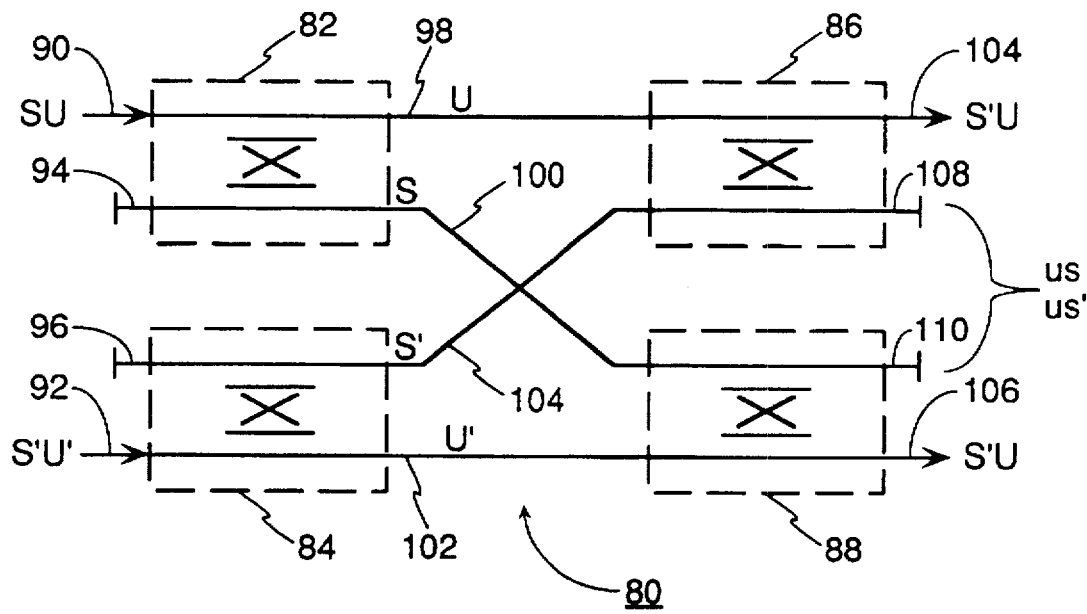
FIG. 9 is a schematic representation of a dilated switch related to that of the invention.
Figure 10:
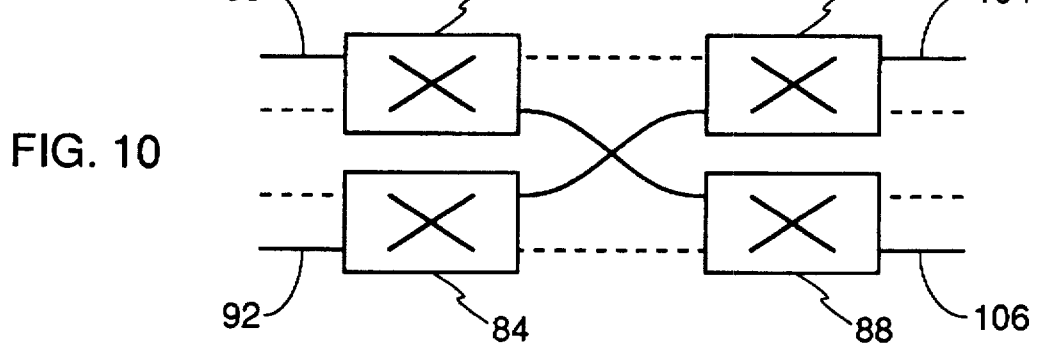
FIGS. 10 and 11 are schematic representations of the two switching states of the dilated switch of FIG. 9.
Figure 11:
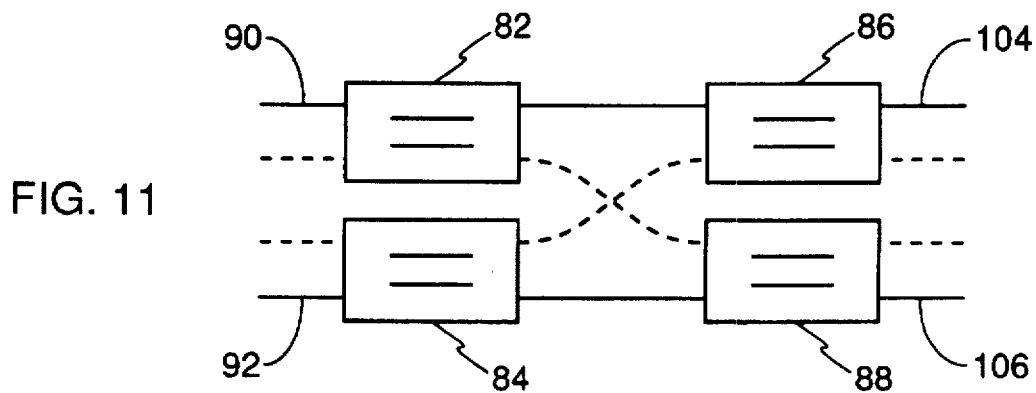
Figure 12:
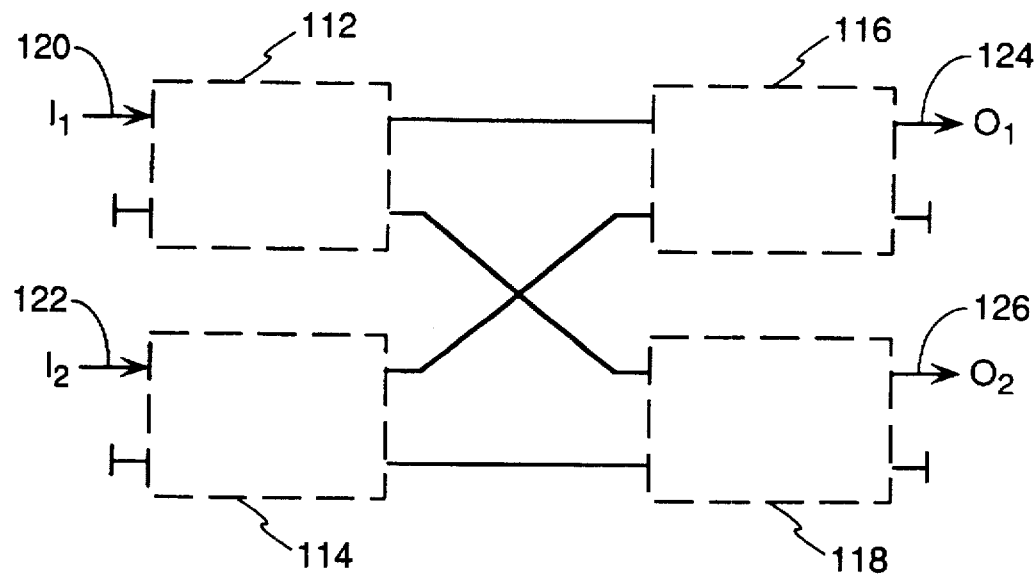
FIG. 12 is a schematic representation of a second dilated switch related to that of the invention.
Figure 13:
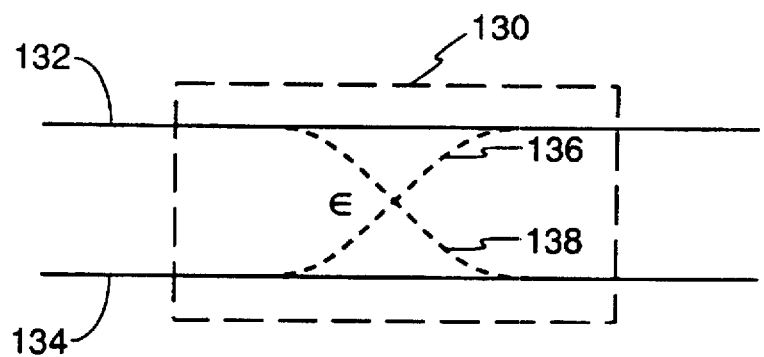
FIGS. 13 and 14 are schematic representations representing the sources of crosstalk in a acousto-optic switch.

Crosstalk requires a longer explanation. The two principal sources of crosstalk noise are rejection crosstalk and sidelobe crosstalk, as discussed briefly with respect to FIGS. 5 through 8. Sidelobe crosstalk is crosstalk into the cross port when the switch is in a bar state for that wavelength but is in a cross state for another wavelength. As illustrated in FIG. 13 for a 2×2 bar-state filter 130, the principal paths 132 and 134 are not switched in the bar state, but non-zero rejection causes a finite portion $\epsilon$ of the unswitched signal to traverse the cross paths 136 and 138 set up for the other wavelength. The size of this crosstalk depends on the relative positions of the wavelength channels and how many of them are in the cross state.

Figure 14:
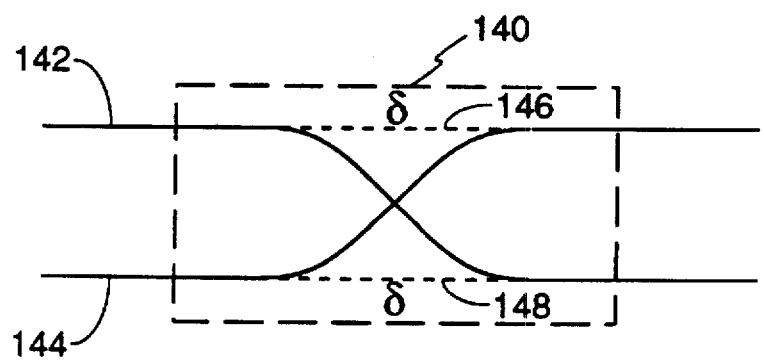

Rejection crosstalk is crosstalk into the bar port at a particular wavelength when the switch is in the cross state for that wavelength. As illustrated in FIG. 14 for a cross-state filter 140 in which the principal paths 142 and 144 are switched, non-zero paths 146 and 148 survive despite the switching. Rejection crosstalk is typically smallest when only that wavelength is in the cross state, and becomes worse (larger) when additional wavelengths are also in the cross state. How rapidly the rejection crosstalk worsens depends on the details of the switch construction and how closely the channels are spaced.

The design of Smith et al. was intended to square all crosstalk level terms so that any crosstalk appearing on the principal outputs is of order $\delta^2$ or $\epsilon^2$ because a surviving crosstalk path traverses either two bar-state switching units or two cross-state switching units. However, such a design is optimum only if the crosstalk levels are approximately equal. Our observation is that the crosstalk terms can differ significantly. In some situations we have encountered, cross-state, bar-port crosstalk is more severe than bar-state, cross-port crosstalk. One such situation involves a close consideration of multi-channel switching effects, as observed by Song et al., in "Time-dependent model of an acousto-optic tunable filter for multiple-channel operations, *Optical Society of America Integrated Photonics Research Meeting '95*, November 1994. However, the invention is equally applicable to the situation wherein bar-state crosstalk is more severe than cross-state crosstalk. In either case, it is preferable that all crosstalk paths cross a minimum number of switching units causing the greater crosstalk, or, realistically in a 2×2 switch, one bar-state switching unit and one cross-state switching unit so that all crosstalk terms be of the order $\epsilon\delta$. In a larger switch, the paths should include an equal number of switching units in the bar and cross states.

Figure 15:
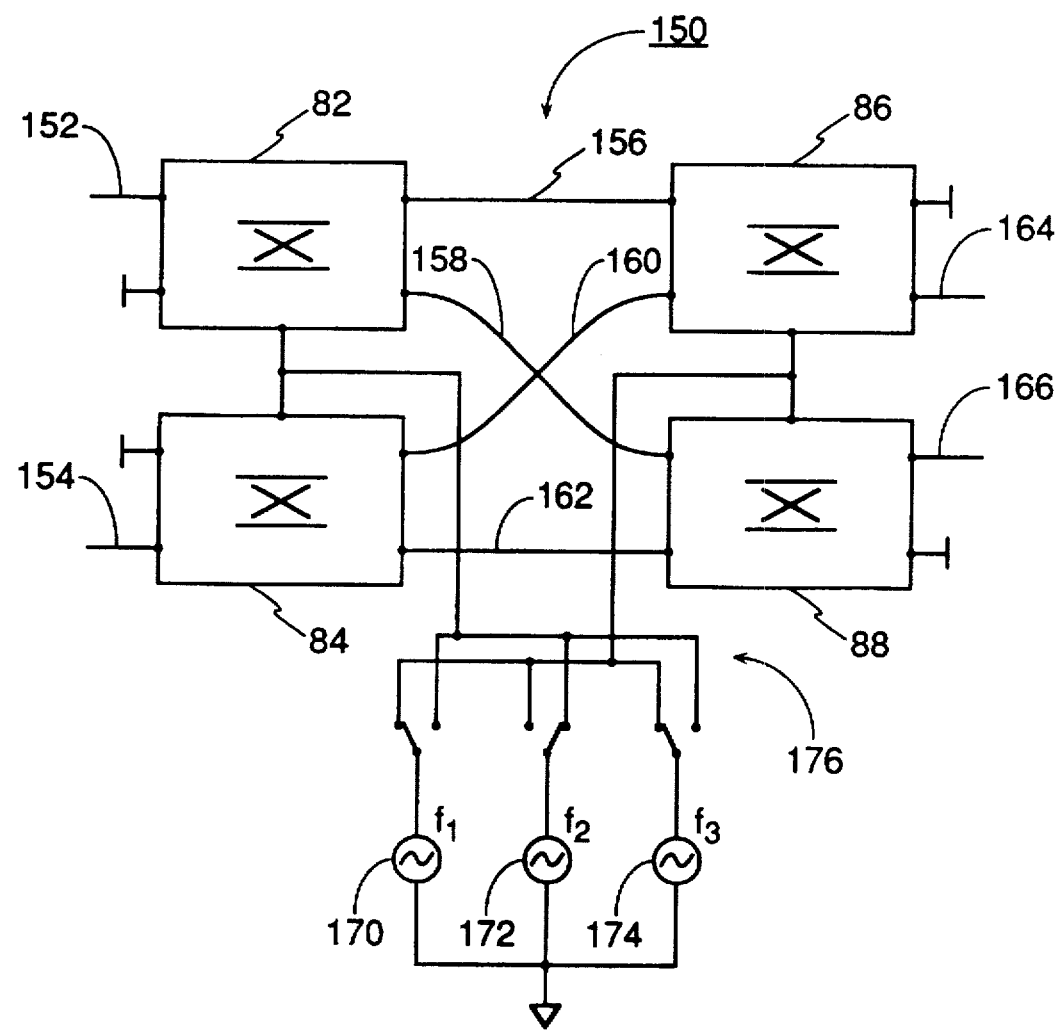
FIG. 15 is a schematic representation of an embodiment of a 2×2 dilated switch according to the invention.

Accordingly, to satisfy both requirements of breaking cycles and minimizing crosstalk, one embodiment of the invention includes a horizontally asymmetrically dilated 2×2 switch 150 illustrated in FIG. 15 having the four 2×2 acousto-optic switching units 82, 84, 86, and 88. However, the inputs 152 and 154, the interswitch connections 156, 158, 160, and 162, and the outputs 164 and 166 are arranged so that a principal signal as well as the crosstalk paths must traverse one bar-state switch and one cross-state switch. The interconnections 156 through 162 can be waveguides formed in a substrate if the switching units 82 through 88 are formed in a single substrate, or they can be optical fiber if each switching unit is formed in its own $LiNbO_3$ substrate.

The control circuitry necessary to achieve the above control can be effected in a number of ways. A schematic representation is given in FIG. 15, in which three RF generators 170, 172, and 174 are switched by a switch and distribution network 176 so as to horizontally asymmetrically control the AOTF switching units 82 through 88; that is, for a particular frequency $f_i$, the switching units 82 and 84 on the left are in one state and the switching units 86 and 88 on the right are in the other state. Because of the interconnections 156 through 162, each signal and crosstalk path passes through one switching unit in the cross state and one in the bar state. The result is a horizontally asymmetrically dilated switch. Although this configuration is facially vertically symmetric, it is called asymmetric in view of the paths being traversed by crosstalk and intended signals. The control circuitry of FIG. 15 is to be considered exemplary only. Any control circuitry is equivalent that has the effect of controlling the different switching units 82 through 88 according to selected RF frequencies.

Figure 16:
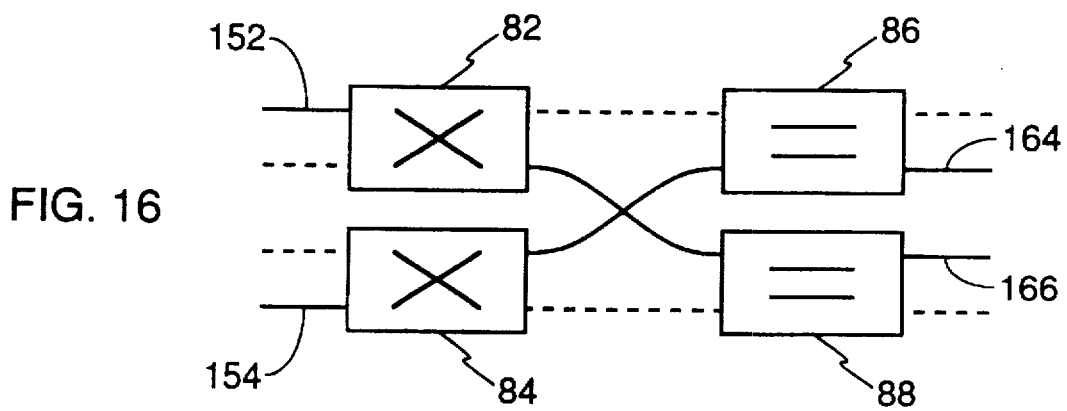
FIGS. 16 and 17 are schematic representations of the two switching states of the dilated switch of FIG. 14.
Figure 17:
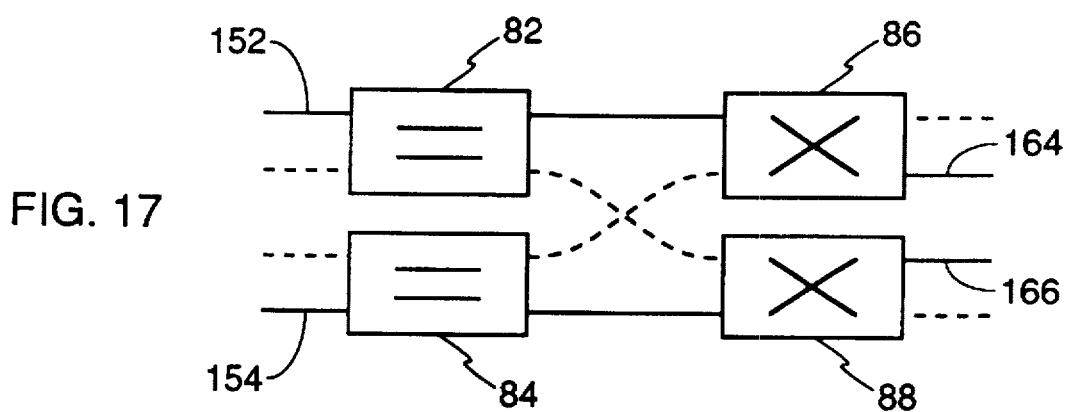

The requirement that all paths traverse one bar-state and one cross-state switch guarantees that the switch is not transparent to noise and that all crosstalk terms are of order $e\delta$. The two different states are illustrated respectively in FIGS. 16 and 17, and the states are represented in TABLE 2.

TABLE 2

| OVERALL SWITCH STATE | FIRST STAGE SWITCH UNITS | SECOND STAGE SWITCH UNITS |
|---|---|---|
| SWITCHED | CROSS | BAR |
| UNSWITCHED | BAR | CROSS |

Each path passes through one cross-state switch and one bar-state switch. Thereby, out-of-band noise is suppressed, and no large crosstalk contribution accumulates.

It should be appreciated that the switch is reciprocal so that a slightly different but equivalent configuration can be obtained by interchanging the used and unused inputs and outputs, that is, flipping the structure right to left. The general configuration of this embodiment has been described by Bala et al. ibid.

This concept is applicable even if the crosstalk or other noise terms are not exactly as defined above but are nonetheless dependent upon the 2×2 switching units being in two states, e.g., the bar and cross states imposed by the application of RF power of selected RF frequencies to the acoustic transducers in AOTFs. The result is that, even if the bar-state and cross-state noise terms have significantly different values, there is no switching circumstance in which the larger term will be accumulated to produce an unacceptably high noise level.

Computer simulations for a 2×2 dilated switch with eight equally spaced wavelength channels around 1550 nm show that the performance of a horizontally asymmetrically dilated switch is improved by about 10 dB over the symmetric configuration. This numerical result is obtained only for a particular combination of AOTF design, number of channels, nominal channel width, and channel separation. Other designs would yield a different improvement.

The asymmetric dilation has the further advantage that it does not further narrow the frequency transfer function of the filter for the selected-channel signal.

This lack of narrowing is advantageous in large networks in which many such filters may be interposed on the propagation path.

Figure 18:
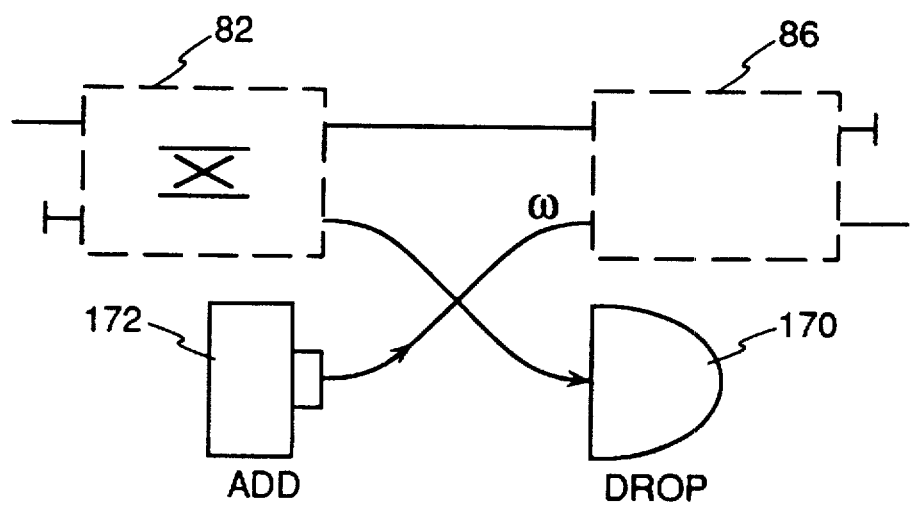
FIG. 18 is a schematic representation of a dilated drop-add switch of the invention.

The dilated switching units shown above have assumed an asymmetry in the overall connection which necessitates the complexity described above. However, an important application, add-drop circuits allow the complexity to be relaxed. In a WDM (wavelength division multiplexed) network, an add-drop circuit is inserted at a point into the network so as to withdraw one signal at a particular wavelength and to reinsert into the network another signal of the same wavelength. In general, a multi-frequency drop-add can be achieved without added conceptual complexity. It is assumed that the dropped or added signal is locally received or transmitted so that network level of noise suppression need not be maintained. Although a drop-add circuit can be easily accommodated within the architecture of FIG. 15, the relaxed noise specification allows an architecture shown in FIG. 18 using only two 2×2 switching units 82 and 86 that are complementarily controlled to be in the bar and cross states for a selected wavelength $\lambda_1$. A drop circuit 170, such as a photodetector, receives a signal at that frequency and an add circuit 172, such as a laser, transmits another signal at that frequency. Although the drop and add signals do not undergo dilated switching, the unswitched signals on other wavelength channels in the network do. However, in the drop-add configuration, it may be advantageous to pass the unswitched network signals through two bar-state switching units (or whichever switching state has the lower crosstalk) in order to minimize the crosstalk in that wavelength channel.

Larger-size dilated switches can be obtained by cascading multiple switches of FIG. 15 in well known architectures, such as the dilated 4×4 Beneš arrangement.

Figure 19:
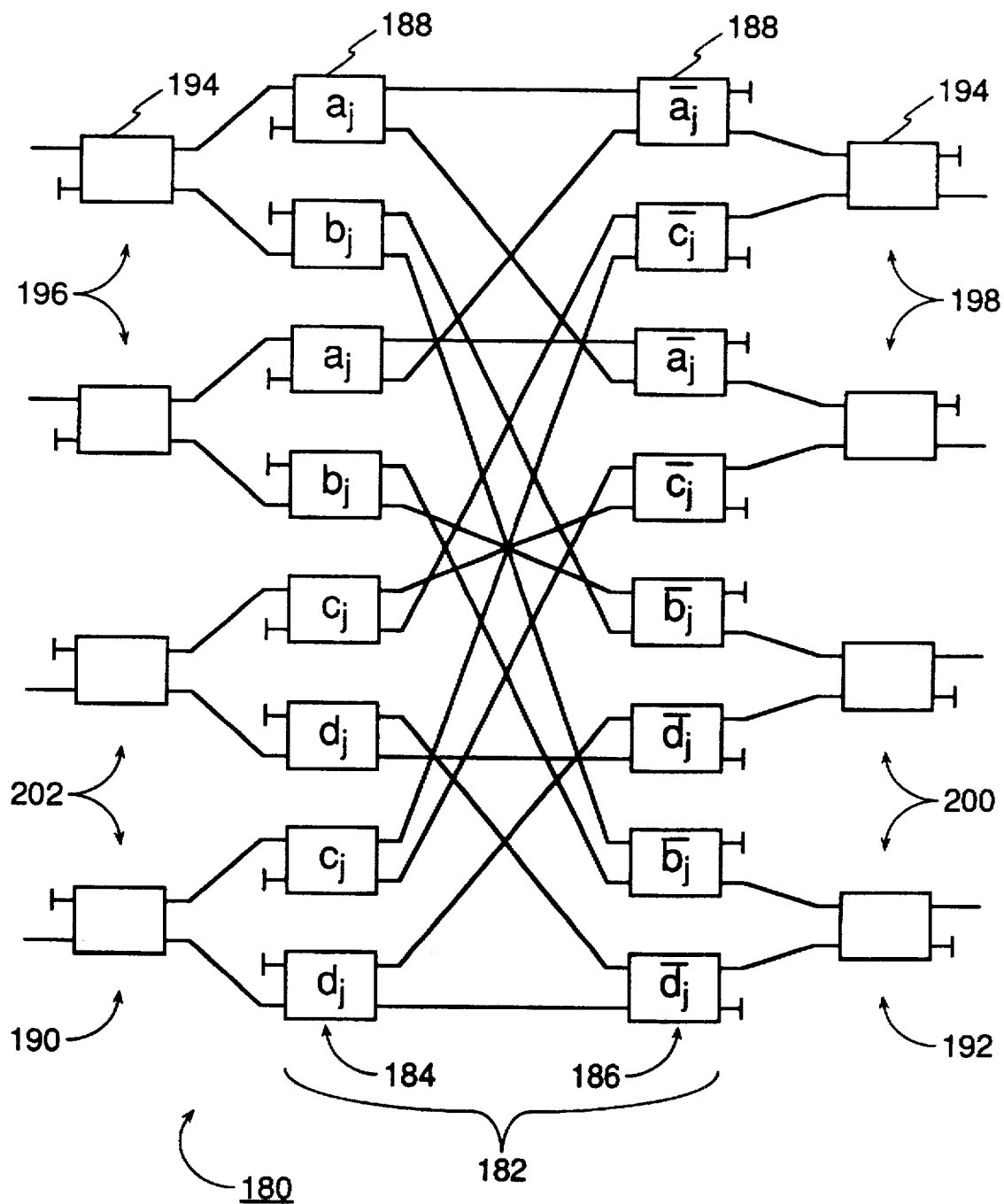
FIGS. 19 and 20 are a schematic representations of different embodiments a dilated 4×4 switch of the invention.

However, more useful arrangements can be obtained by asymmetrically dilating the switch as a whole. A horizontally asymmetrically dilated, rearrangeably non-blocking 4×4 switch 180 is schematically illustrated in FIG. 19. An inner portion 182 includes two ranks 184 and 186 each of eight 2×2 switching units 188 surrounded by two outer ranks 190 and 192 of similar 2×2 switching units 174. The inner switching units 188 are controlled by four independent RF switching signals $a_j$, $b_j$, $c_j$, and $d_j$ and their complements $\bar{a}_j$, $\bar{b}_j$, $\bar{c}_j$, and $\bar{d}_j$, corresponding to each j-th of a plurality of multi-wavelength optical carriers. The switching states $a_j$, $b_j$, $c_j$, and $d_j$ represent the four independent switching states that affect the j-th wavelength channel of the 4×4 switch 180, both as to output channel and crosstalk contributions. The interconnections between the switching units 188 of the inner portion 182 and their control signals are such that they are horizontally asymmetrically dilated. That is, whatever signal or crosstalk path passes a switching unit 188 in the first rank 184 having the bar-state passes a switching unit 188 in the second rank 186 having the cross-state and vice versa. In addition to the required control of the inner portion 182, the two outer ranks 190 and 192 provide the desired dilation. For example, consider the pair 196 in the upper left quadrant. Their upper outputs, which are bar-state outputs, necessarily pass the pair 198 in the upper right quadrant while in their respective cross states. Similarly, the lower outputs of the upper left pair 196, which are cross-state outputs, necessarily pass the pair 200 in the lower right quadrant while in their respective bar states. Similar arguments can be made for the pair 202 in the lower left quadrant. The result is that the inner ranks 184 and 186 are pairwise horizontally asymmetrically dilated and so are the outer ranks 190 and 192. Thereby, a used signal and an undumped crosstalk path pass through two bar-state and two cross-state switching units 188 and 194.

Figure 20:
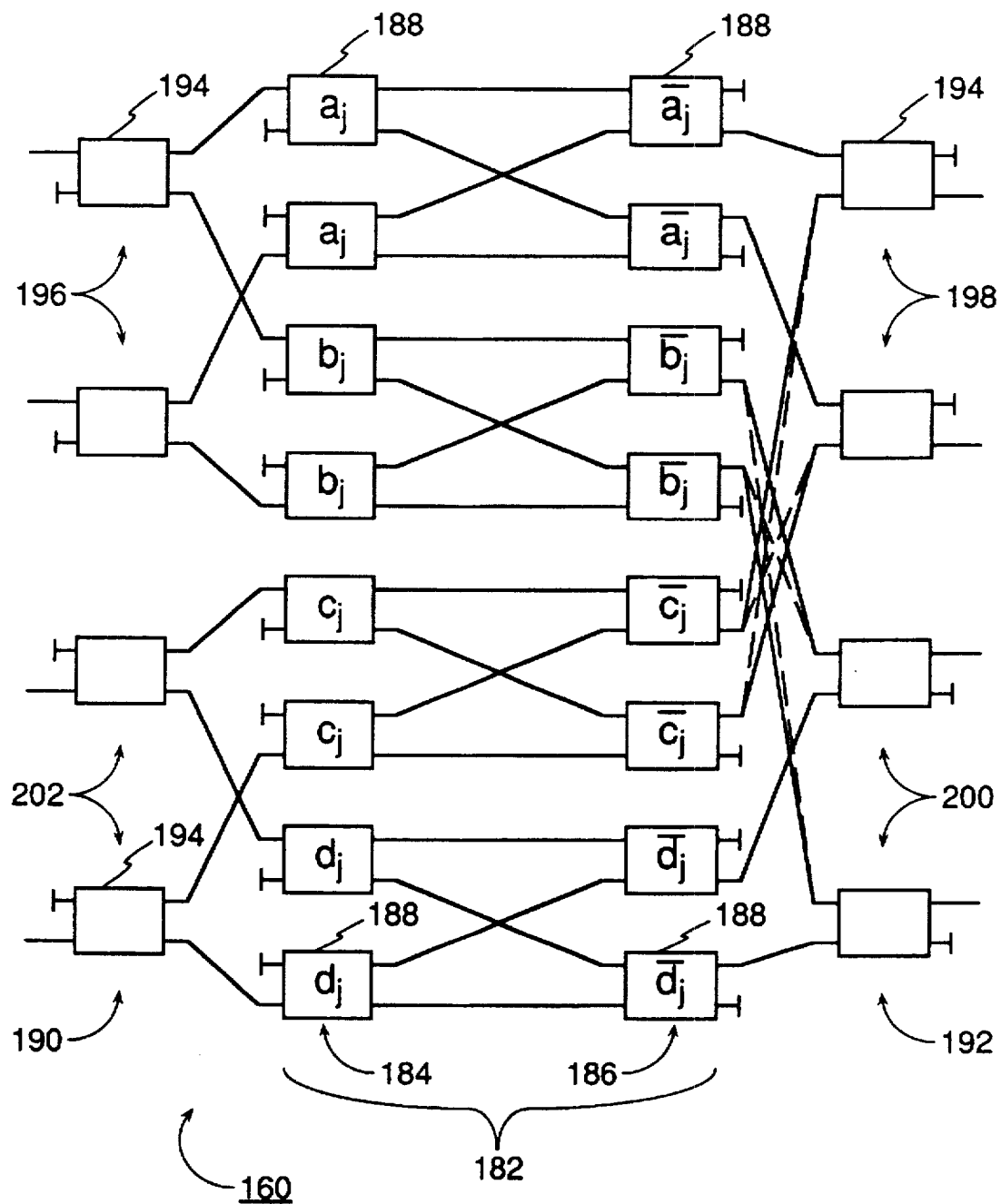

The arrangements and connections of FIG. 19 can be redrawn as shown in FIG. 20. The result resembles the router/selector architecture (using 1×2 switches) described by Hinton in *An Introduction to Photonic Switching Fabrics*, Plenum, 1993, pp. 89–93, 104, and 105. However, Hinton fails to disclose dilation using unused ports and the balancing of cross and bar states. The dashed lines of FIG. 20 shows an alternative connection set.

The architecture of FIG. 19 and the equivalent architecture of FIG. 20 are also strictly non-blocking so that any input can reach any output and all four cross connections can be made as long as there is no contention for an output. The control circuitry is not illustrated but is easily devised since there is only one path from any input to any output and that path determines the state of the four intervening switching units 188 and 194.

Figure 21:
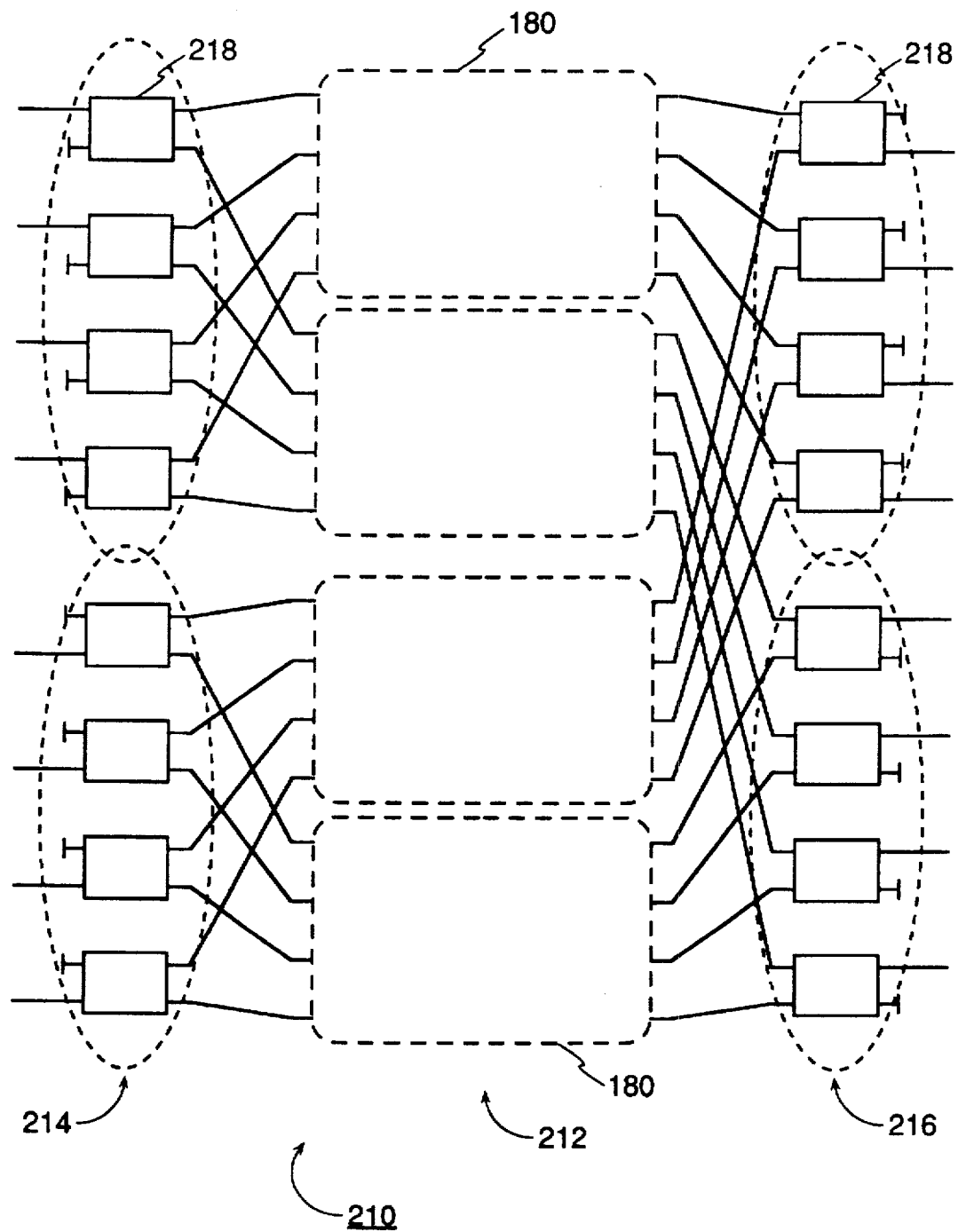
FIG. 21 is a schematic representations of a dilated 8×8 switch of the invention.

The horizontally asymmetrically dilated architecture can be extended to yet larger-size configurations. For example, as illustrated in FIG. 21, an 8×8 dilated switch 210 includes an inner portion 212 of four of the 4×4 dilated switches 180 of FIG. 18 or 19 bracketed by outer ranks 214 and 216 of 2×2 switching units 218. The same analysis as made before between the cross and bar states of the four quadrants shows the outer ranks 214 and 216 are pairwise horizontally asymmetrically dilated.

These examples show that a larger-size switch can be designed by arranging four of the next smaller-size switches in the middle. Then two ranks of 2×2 switching units bracket the central portion. Each quadrant of these two ranks have similarly oriented used or unused inputs or outputs. The connections from the input ranks to the central portion are arranged such that the first-rank inputs of one state are switched to one output quadrant while those of the second state are switched to the other output quadrant. The orientations of the input and output quadrants are set so as to be pairwise horizontally asymmetric. Thereby, all useful signals pass through an equal number of bar and cross states.

This approach can be extended to yet higher order N×N with the number of columns $2\log_2 N$ and the number of switching units $2N(N-1)$. A fully dilated but not horizontally asymmetrical Beneš configuration requires 16 units for a 4×4 switch and 44 units for a 8×8 switch. The corresponding numbers for a horizontally asymmetrically fully dilated switch of the invention are 24 and 112 units. Thus, the reduced crosstalk of the invention is purchased with presently available technology at the expense of only moderate increase in system size and complexity for at least a 4×4 dilated cross-connect.

Although the above example has mostly concerned acousto-optical polarization converters, the invention can be equally applied to other types of optical switches, for example, to switches utilizing electro-optic switching units.

The invention thus provides an architecture that at the systems level provides reduced level of crosstalk in optical switches.

What is claimed is:

1. An optical switch comprising a plurality of switching units each having a first switching state and a second switching state and being arranged in a plurality of sequential stages, wherein interconnections and control of said switching units are such that all paths between each of a plurality of inputs and each of a plurality of outputs are arranged to provide, in each of said paths, equal numbers of switching units in each of said first and said second switching states.

2. An optical switch as recited in claim 1, wherein said switching units are 2×2 units.

3. An optical switch as recited in claim 2, wherein said two switching states are a bar state and a cross state.

4. An optical switch as recited in claim 2, wherein said switching units have either one unused input or one unused output, three remaining inputs or outputs of each of said switching units being connected within said optical switch.

5. An optical switch as recited in claim 1, wherein said switching units comprise acousto-optical polarization converters.

6. An optical switch as recited in claim 2, wherein said switching units comprise 1×2 switching units and 2×1 switching units.

7. An optical switch as recited in claim 1, wherein said switching units are arranged in a switch of size N×N, where $N=2^m$, wherein m is an integer greater than 0.

8. An optical switch as recited in claim 7, wherein m=1.

9. An optical switch as recited in claim 7, wherein m>1.

10. An optical switch comprising:
   a) an even plurality of successively-arranged stages each comprising a plurality of 2×2 optical switching units, each said switching unit having a first switching state and a second switching state;
   b) interconnections between said switching units of neighboring stages, whereby optical signals are switchable along area single respective switching path from each input side port of said switch to each output side port thereof; and
   c) control means for controlling said switching units to form said switching paths, whereby each said path passes through equal numbers of said switching units in each of said first state and said second state.

11. An optical switch as recited in claim 10, wherein all of said switching units have either one unused input or one unused output.

12. A method of controlling an optical switch comprising a plurality of optical switching units interconnected by optical channels and arranged in sequential stages to form a switching fabric between a plurality of input ports and a plurality of output ports, said input and output ports being formed by respective inputs and outputs of said optical switching units in a first and a last of said sequentially arranged stages, each said optical switching unit being switchable between a first switching state and a second switching state to form different interconnections between inputs and outputs thereof, said method comprising:
   a) interconnecting said optical channels between optical switching units of sequential stages, whereby optical signals are switchable along a single respective switching path between each one of said input ports and each one of said output ports; and
   b) controlling at least one optical switching unit in each of said stages to form said path from said one input port to said one output port, which path passes through equal numbers of said optical switching units in each of said first and said second switching states.

13. A method as recited in claim 12, wherein said optical switching units are 2×2 optical switching units.

* * * * *